Oct. 11, 1938.  F. BUCHSTEIN  2,133,130
SUPRA PUBIC DRAIN APPLIANCE
Filed Dec. 11, 1936   2 Sheets-Sheet 1
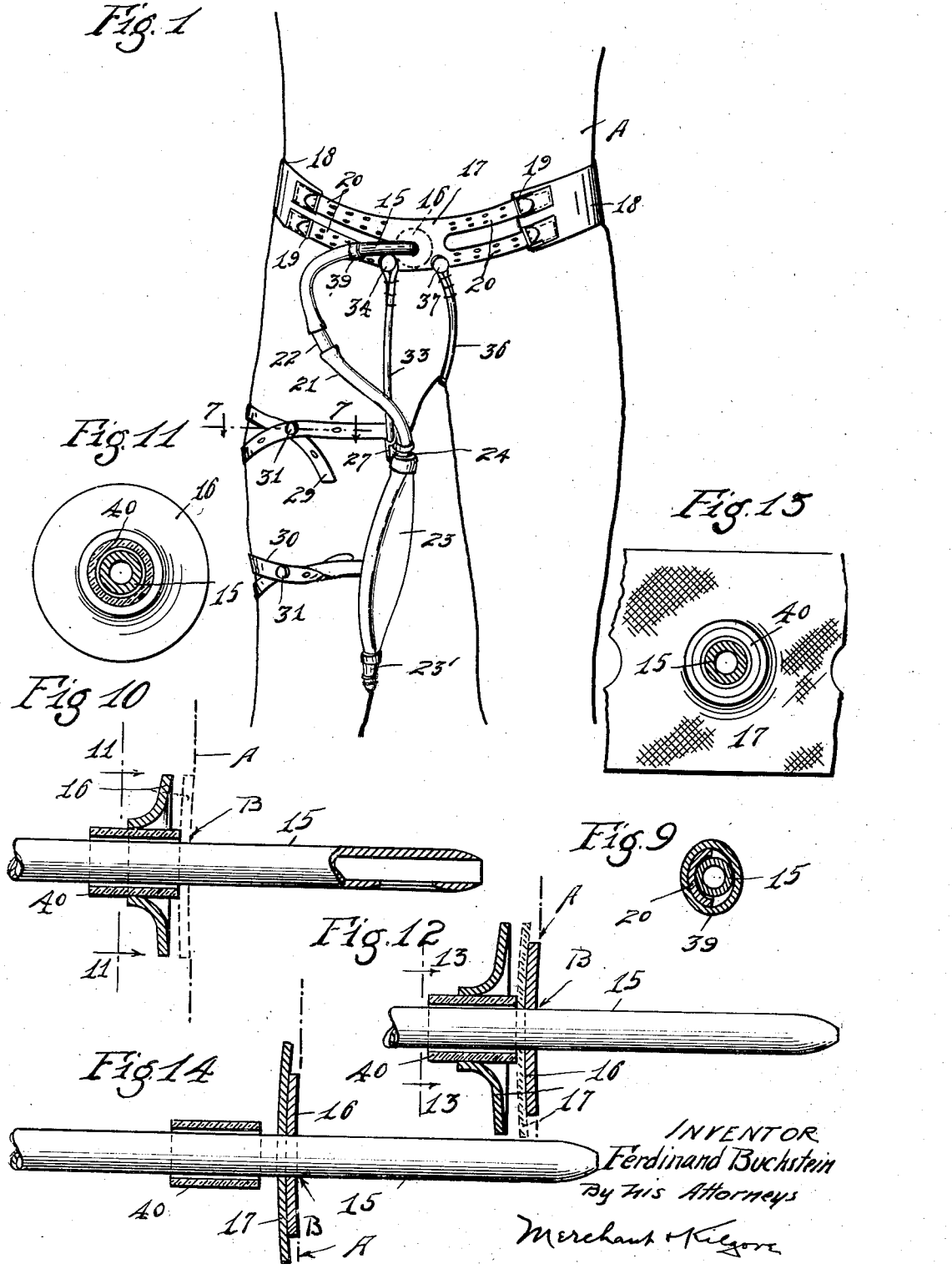

Oct. 11, 1938.　　　F. BUCHSTEIN　　　2,133,130
SUPRA PUBIC DRAIN APPLIANCE
Filed Dec. 11, 1936　　　2 Sheets-Sheet 2
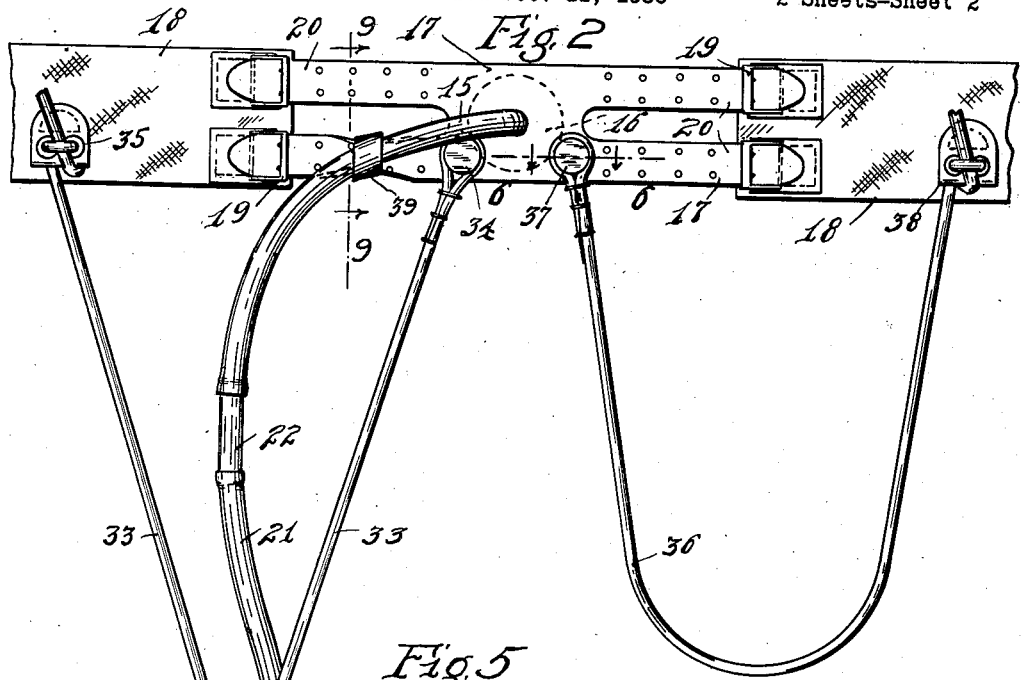
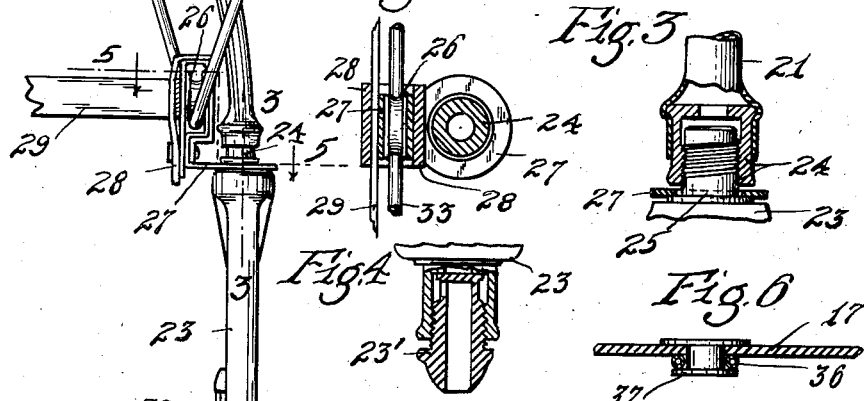
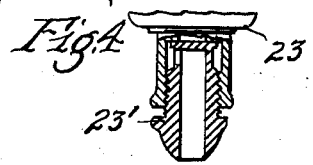
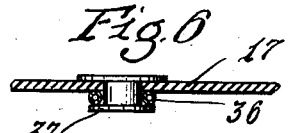
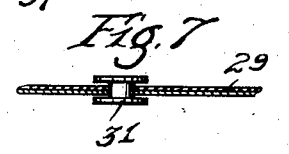
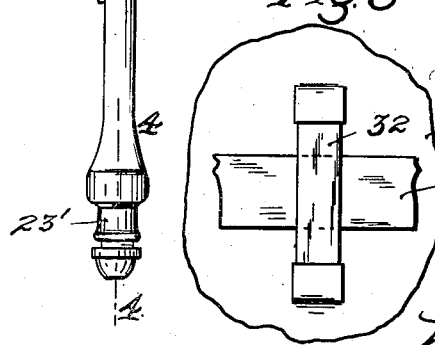
INVENTOR
Ferdinand Buchstein
By his Attorneys
Mereland Kilgore Patented Oct. 11, 1938

2,133,130

UNITED STATES PATENT OFFICE 2,133,130

SUPRA-PUBIC DRAIN APPLIANCE

Ferdinand Buchstein, Minneapolis, Minn.

Application December 11, 1936, Serial No. 115,273

11 Claims. (Cl. 128—349)

My present invention relates to a supra-pubic drain appliance.

In the treatment of certain diseases of the bladder and prostate gland, it frequently is necessary to provide an unnatural means of egress of urine from the bladder. This the urological surgeon accomplishes by making an incision through the abdominal wall, just above the pubis, extending into the bladder. The operation is known as supra-pubic cyctosomy; the opening thus formed is a supra-pubic urinary fistula. Through this fistula a soft rubber catheter may be passed into the bladder for the collection and removal of the urine.

The problem of maintaining this catheter in its proper position and of preventing the escape of urine around the catheter and onto the surface of the body is a difficult one. Many devices have been employed for this purpose, but none have been entirely satisfactory. Some permit shifting of the catheter, with resultant improper drainage of the urine and distress to the patient. Others allow seepage of urine about the catheter, creating a malodorous and uncomfortable condition. Often a bottle is employed as a reservoir for the urine drained through the catheter, a cumbersome arrangement. Finally stated, all these devices are inconvenient if not difficult and painful to remove, clean and replace.

The object of this invention, in view of the above facts, is the provision of an apparatus, hereinafter described, which will afford an efficient, convenient and comfortable method of supra-pubic urinary drainage.

To the above end, generally stated, the invention consists of the novel devices and combination of devices hereinafter described and defined in the claims:

In the accompanying drawings, which illustrate the invention, like characters indicate like parts throughout the several views.

Referring to the drawings:

Fig. 1 is a front elevation of the improved appliance applied to a body fragmentarily and diagrammatically illustrated;

Fig. 2 is a fragmentary view in elevation of the appliance, as shown in Fig. 1, but removed from the body and on an enlarged scale;

Figs. 3, 4, 5 and 6 are fragmentary detail views principally in section taken on the lines 3—3, 4—4, 5—5, and 6—6 of Fig. 2, respectively, on an enlarged scale;

Fig. 7 is a fragmentary detail view with some parts sectioned on the line 7—7 of Fig. 1;

Fig. 8 is a fragmentary detail view of the urinal bag and the lower attaching strap;

Fig. 9 is a detail view in section taken on the line 9—9 of Fig. 2, on an enlarged scale;

Fig. 10 is a fragmentary view partly in side elevation and partly in section showing the catheter and washer and the thimble for adjusting the washer on the catheter, said view also showing, by means of broken lines, the washer removed from the thimble and positioned on the catheter against the body, as shown in Fig. 1;

Fig. 11 is a view partly in front elevation and partly in section taken on the line 11—11 of Fig. 10;

Fig. 12 is a view corresponding to Fig. 10 but showing the plate carried by the thimble for adjustment on the catheter relative to the washer and also showing, by means of broken lines, the plate removed from the thimble and positioned on the catheter against the washer;

Fig. 13 is a fragmentary detail view partly in front elevation and partly in section taken on the line 13—13 of Fig. 12; and Fig. 14 is a view corresponding to Fig. 12 but showing the plate removed from the thimble and positioned on the catheter against the washer.

For the purpose of showing the invention applied in working position there is diagrammatically and fragmentarily illustrated in the drawings, the body of a man designated by the letter A. It may be assumed that the body A has a supra-pubic fistula B.

The improved appliance includes a soft rubber catheter 15 of appropriate caliber, whereby the same may be introduced into the fistula B to any depth desired by the attending physician. To prevent the catheter 15 from passing further into the bladder, not shown, a rubber washer 16 is placed on the catheter 15 next to the body A. The hole in the washer 16 is of such size as to fit quite snugly about the catheter so that the same will not slip from its adjusted position thereon. Obviously, this washer 16 permits the catheter 15 to be removed from the fistula B from time to time for the purpose of cleaning the same and then replaced in its original adjustment. The rubber washer 16 also performs another important function in that it prevents, by its engagement with the body, seepage of urine about the catheter 15.

A flat rubber plate 17 is also applied to the catheter 15 outwardly of the washer 16 by having a central hole through which the catheter projects. This hole in the catheter is of such caliber as to fit snugly about said catheter.

A fabric belt 18, applicable around the body A at a point anteriorly to the ilium on both sides below the crests of the iliac bones, is detachably and adjustably attached to the plate 17 by buckles 19 on said belt and two pairs of straps 20 integral with said plate. This belt 18 holds the plate 17 firmly pressed against the body A, thus preventing the catheter 15 from slipping out of position and providing the pressure necessary to maintain the washer 16 in close opposition with the body surface.

A length of rubber tubing 21 is separably attached to the catheter at its outer end by a coupling 22 in the form of a glass tube and which tubing leads to and empties into a rubber urinal bag 23. The object of the glass tube 22 is to permit visual observation of the passage of urine through the catheter 15. The glass tube 22 is introduced into the adjacent ends of the catheter 15 and tubing 21 with sufficient pressure to prevent accidental separation of said catheter and tubing. The tubing 21 is attached to the bag 23, at its upper end, by a separable coupling 24.

The bag 23, which functions as a reservoir for the urine which is drained from the bladder, is provided with a valve 23' at its lower end which permits of draining off the contained urine. In the member of the coupling 24 attached directly to the bag 23 is a check valve 25 which prevents a return flow of urine in the bag 23 when the wearer of the appliance lies down.

A small pulley 26 is journaled in the upright member of a bearing bracket 27. This bracket 27 is swivelled to the coupling 24 and permits the pulley 26 to swing about the axis of said coupling, see Figs. 2, 3 and 5. The upright member of the bracket 27 is covered with a soft leather facing 28 to prevent the bracket 27 from coming in direct contact with the wearer. The bag 23 is attached to the wearer's thigh by rubber straps 29 and a lower rubber strap 30. Each strap 29 and 30 is adjustably held about the wearer's thigh by having its end portion connected by a button 31 insertable through any one pair of aligned holes in the respective strap. The upper strap 29 is indirectly attached to the bag 23 by being inserted between the back of the bracket 27 and the facing 28 with freedom for endwise sliding movement. The lower strap 30 is directly attached to the bag 23 by a keeper 32 with freedom for endwise sliding movement. The bag 23 is suspended at a proper level by a rubber cord 33, one end of which is detachably attached by a button 34 to plate 17 at one of its lower corners. This cord 33 from the button 34 passes through the pulley 26 and from thence it passes between the wearer's thighs and up over the posterior aspect of the body where it is adjustably attached to the belt 18 by a tab 35 having eyelets through which the respective end of said cord is laced. Obviously, the pulley 26 permits free movement of the cord 33 with the body without disturbing the position of the bag or placing undue strain on the body which would tend to discomfort the wearer.

A rubber cord 36 similar to the cord 33 has one of its ends detachably attached to the plate 17 by a button 37 at the opposite lower corner of the plate 17 from the button 34. This cord 36 is passed from the button 37 downward over the anterior aspect of the body surface, between the thighs and upwardly over the posterior of said body surface, and is adjustably attached to the belt 18 by a tab 38 similar to the tab 35. The two cords 33 and 36 assist in fixing the plate 17 in position and in holding it against the body A and washer 16.

To hold the section of the catheter outwardly of the plate 17 snugly against the body A, the same is passed through a rubber ring 39 on the lower right-hand strap 20, see Figs. 2 and 9.

For use in connection with the above described appliance a thimble 40 of glass or other suitable material is employed to facilitate the application of the washer 16 and the plate 17 to the catheter 15. The inside caliber of the thimble is such as to barely slip freely over the catheter 15. The thimble 40 is then removed from the catheter 15 and forced into the hole in the rubber plate 17 and again said thimble 40 is passed over the catheter 15 until said plate lies next to the washer 16. Said plate 17 is held in this position and the thimble 40 removed therefrom and at which time said plate contacts onto the catheter and is thereby frictionally held against movement on said catheter. The catheter 15, washer 16 and plate 17 having thus been assembled into a single unit may be subsequently removed from the wearer as one-piece, cleaned, sterilized and replaced without the necessity of readjusting the catheter to the proper depth. Next the belt 18 is passed around the body of the wearer and buckled to the strap 20 of the plate 17 and the bag 23 attached to the wearer's leg by the straps 29 and 30. Finally the catheter 15 is attached to the tubing 21 by the glass tube coupling 22.

The above described appliance is applied in operative position to the wearer in the following manner, to wit: It may be assumed that the washer 16 and plate 17 are removed from the catheter 15, that the belt 18 is detached from the straps 20, that the catheter 15 is separated from the tubing 21 at the coupling 22, and that the cords 33 and 36 are released from the buttons 34 and 37.

With the appliance thus disassembled the catheter 15 is inserted into the supra-pubic fistula to the desired depth. Next, the thimble 40 is forced into the hole in the rubber washer 16 and said thimble passed over the catheter until the washer 16 lies snugly against the body surface. Holding the washer 16 in this position the thimble 40 is removed therefrom and at which time the released washer 16 contracts onto the catheter 15 and is thereby frictionally held against movement on said catheter. The entire appliance is now properly assembled and in working order.

It may be here stated that in a broad sense the plate 17 forms a part of the belt 18.

The above described device is capable of various modifications within the scope of the invention herein disclosed and claimed.

What I claim is:

1. In an appliance of the class described, a belt applicable around the body of the wearer, a catheter having a member engageable with the body surface of the wearer to limit the depth the catheter may be passed through a supra-pubic urinal fistula in the body, a receptacle having a pulley, a cord arranged to run over the pulley and attached to the belt for holding the receptacle suspended from the belt.

2. In an appliance of the class described, a belt applicable around the body of the wearer, a catheter having a member engageable with the body surface of the wearer to limit the depth the catheter may be passed through a supra-pubic urinal fistula in the body, a receptacle having a pulley, a cord arranged to run over the pulley and attached to the belt for holding the receptacle suspended from the belt, said belt holding the member pressed against the body of the wearer to prevent outward movement of the catheter in the fistula.

3. The appliance defined in claim 1 which further includes a strap for attaching the bag to the thigh of the wearer.

4. In an appliance of the class described, a belt applicable around the body of the wearer, a catheter having a member engageable with the body surface of the wearer to limit the depth the catheter may be passed through a supra-pubic urinal fistula in the body, a receptacle, a pulley-equipped bracket swivelled to the receptacle, a cord arranged to run over the pulley and attached to the belt for holding the receptacle suspended from the belt.

5. The appliance defined in claim 4 which further includes a strap for attaching the pulley bracket to the thigh of the wearer, and a second strap for attaching the receptacle to said thigh.

6. The appliance defined in claim 1 which further includes a cord arranged to be passed between the thighs of the wearer and having its ends attached to the belt to hold the belt in position.

7. In an appliance of the class described, a relatively soft rubber catheter, a rubber washer adapted to be passed over the catheter for adjustment longitudinally thereof for engagement with the body surface of the wearer to vary the depth the catheter may be inserted through a supra-pubic urinal fistula in the body, a rubber plate having a hole through which the catheter is passed outwardly of the washer, the caliber of the holes in the washer and the plate being such that the washer and plate pinch the catheter and are thereby frictionally held thereon, a belt adapted to be passed around the body of the wearer, buckle-equipped straps connect the plate to the belt, said plate holding the washer pressed against the body surface to prevent outward movement of the catheter in the fistula, a rubber bag, means for attaching the bag to the thigh of the wearer, a tubing leading to the bag, a transparent tube connecting the catheter and the tubing, a pulley on the rubber bag, a cord arranged to run over the pulley and having one of its ends attached to the belt and the other end attached to the plate, and a cord adapted to be passed between the thighs of the wearer and attached at one of its ends to the belt and at the other end to the plate for holding the belt and plate in position.

8. In an appliance of the class described, a catheter, a rubber washer and an elastic plate, the latter having a central hole, the holes in the washer and plate having a diameter slightly less than the external diameter of the catheter, a thimble having an external diameter greater than the diameter of the holes in said washer and plate, said washer and plate being successively applicable to the thimble by forcing said thimble through the holes in the washer and the plate which expands the same, the internal diameter of the thimble being greater than the external diameter of the catheter whereby the thimble may be passed over the catheter to first longitudinally position the washer thereon and thereafter position the plate outwardly of the washer.

9. In an apparatus of the class described, a belt applicable around the body of the wearer, a receptacle having a pulley, and a cord arranged to run over the pulley and attached to the belt for holding said receptacle suspended from the belt.

10. In an appliance of the class described, a catheter, an elastic washer applicable over the catheter for adjustment longitudinally thereon, the hole in the washer having a normal diameter slightly less than the external diameter of the catheter, and a thimble for expanding the hole in the washer and having an internal diameter greater than the external diameter of the catheter and through which thimble the catheter extends, whereby the washer may be moved freely longitudinally on the catheter.

11. In an appliance of the class described, a relatively soft rubber catheter, a washer having substantially no radial stretch and applied to the catheter for longitudinal adjustment thereon, the caliber of the hole in the washer being slightly less than the external diameter of the catheter, whereby said washer will circumferentially contract the catheter and be frictionally held thereby against longitudinal movement thereon, and a belt having an aperture through which the catheter, outwardly of the washer, loosely extends, whereby the belt will hold the washer pressed against a body and the held washer, in turn, holds the catheter against relative longitudinal movement.

FERDINAND BUCHSTEIN.